United States Patent
Zacchio et al.

(10) Patent No.: US 10,397,869 B2
(45) Date of Patent: Aug. 27, 2019

(54) PROCESSOR VALIDATED WAKEUP SYSTEM AND METHOD

(71) Applicant: Carrier Corporation, Farmington, CT (US)

(72) Inventors: Joseph Zacchio, East Hartford, CT (US); Nicholas C. Soldner, Southbury, CT (US); Vijaya R. Lakamraju, Farmington, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 15/507,828

(22) PCT Filed: Sep. 14, 2015

(86) PCT No.: PCT/US2015/050053
§ 371 (c)(1),
(2) Date: Mar. 1, 2017

(87) PCT Pub. No.: WO2016/044190
PCT Pub. Date: Mar. 24, 2016

(65) Prior Publication Data
US 2017/0295545 A1    Oct. 12, 2017

Related U.S. Application Data

(60) Provisional application No. 62/050,487, filed on Sep. 15, 2014.

(51) Int. Cl.
*H04W 52/02* (2009.01)
*H04W 88/06* (2009.01)

(52) U.S. Cl.
CPC ....... *H04W 52/0229* (2013.01); *H04W 88/06* (2013.01); *Y02D 70/00* (2018.01); *Y02D 70/144* (2018.01)

(58) Field of Classification Search
CPC ... H04W 52/0229; H04W 88/06; Y02D 70/00
(Continued)

(56) References Cited

U.S. PATENT DOCUMENTS 5,909,093 A * 6/1999 van Dinteren ............ E06B 9/32
318/16
8,373,578 B1 * 2/2013 Sikora .................... G08G 1/087
340/901

(Continued)

FOREIGN PATENT DOCUMENTS

WO    WO-2012168551 A1    12/2012

OTHER PUBLICATIONS

PCT International Search Report and Written Opinion dated Feb. 29, 2016 issued on corresponding PCT International Patent Application No. PCT/US2015/050053 (14 pages).
(Continued)

*Primary Examiner* — Allen T Cao
(74) *Attorney, Agent, or Firm* — Locke Lord LLP; Scott D. Wofsy; Judy R. Naamat

(57) ABSTRACT

A system includes a transceiver for receiving a wake up signal from a wireless communication device. A processor is operatively connected to the transceiver and to a memory. The memory includes instructions recorded thereon that, when read by the processor, cause the processor to transition from a sleep mode to an active mode and power up the transceiver upon validation of the wake up signal.

11 Claims, 3 Drawing Sheets

(58) Field of Classification Search
USPC .............................................. 340/10.3–10.34
See application file for complete search history.

(56) References Cited

U.S. PATENT DOCUMENTS

| | | |
|---|---|---|
| 2003/0107475 A1 | 6/2003 | Bautista et al. |
| 2003/0119568 A1 | 6/2003 | Menard |
| 2006/0030353 A1 | 2/2006 | Jun |
| 2006/0145815 A1* | 7/2006 | Lanzieri ............... G06K 7/0008 |
| | | 340/10.2 |
| 2011/0311052 A1 | 12/2011 | Myers et al. |
| 2014/0110613 A1* | 4/2014 | Pitchford .............. F16K 31/082 |
| | | 251/129.01 |

OTHER PUBLICATIONS

Mexican Office Action for Mexican Patent Application No. MX/a/2017/002761, dated Jan. 15, 2019.
European Office Action for European Patent Application No. 15782102.6, dated Jul. 16, 2018.

* cited by examiner

PROCESSOR VALIDATED WAKEUP SYSTEM AND METHOD

CROSS-REFERENCE TO RELATED APPLICATIONS

This application is a U.S. National Stage Application of PCT/US2015/050053 filed Sep. 14, 2015, which claims the benefit of U.S. Provisional Patent Application No. 62/050,487 filed Sep. 15, 2014, the contents of which are incorporated herein by reference in their entirety.

BACKGROUND OF THE INVENTION

1. Field of the Invention

The present invention relates generally to wireless networks and in particular to power management for wireless networks.

2. Description of Related Art

Wireless networks may be used to transmit signals to devices that are activated intermittently. For example, a wireless signal may be used to lock or unlock a door leading to a house or hotel room. Most often, the circuitry within the locking device is in a sleep mode until triggered by a wakeup signal. Preserving power within the device during periods of nonuse is traditionally limited by the ability to put the system of the device into lower power sleep modes. Traditionally, there exist systems for managing power consumption of the device which make it available to receive external requests. For example, a receiver of the device may power up on a schedule and check for signals. This scheduling approach allows the receiver to be shut down most of the time and conserve battery power. There are at least two limitations with this method. First, the receiver is still being powered-up at certain intervals which can require the use of critical battery power. Second, some wireless networks require acquisition time for the network to synchronize and verify security protocols, and the like. This can be a time consuming process and by correlation, a power consuming process.

Such conventional methods and systems have generally been considered satisfactory for their intended purpose. However, there is still a need in the art for improved power management for wireless networks. The present disclosure provides a solution for this need.

SUMMARY OF THE INVENTION

A system includes a transceiver for receiving a wake up signal from a wireless communication device. A processor is operatively connected to the transceiver and to a memory. The memory includes instructions recorded thereon that, when read by the processor, cause the processor to transition from a sleep mode to an active mode and to power up the transceiver upon validation of the wake up signal.

The processor can analyze a pulse of the wake up signal to determine if the wake up signal is valid such that the processor can be fully activated if the wake up signal is valid. The processor can return to sleep mode if the wake up signal is invalid.

The transceiver can receive an RF wake up signal from an RF source such as a smart phone. The system can also include an RF detector for converting the RF wake up signal to DC pulses to be evaluated by the processor.

A method for transitioning a system from a sleep mode to an active mode includes receiving a wake up signal from a wireless communication device at a transceiver. The wake up signal is validated through a processor. The processor wakes from a sleep mode upon validation of the wake up signal.

A system for providing access to a locked device comprises a locking mechanism configured to selectively switch between a locked state and an unlocked state. A wireless interface is operatively connected to the locking mechanism to control change between the locked and unlocked states. The wireless interface is configured to receive a wake up signal from a wireless communication device at a transceiver and validate the wakeup signal through a processor. Upon validation the processor activates the locking mechanism.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
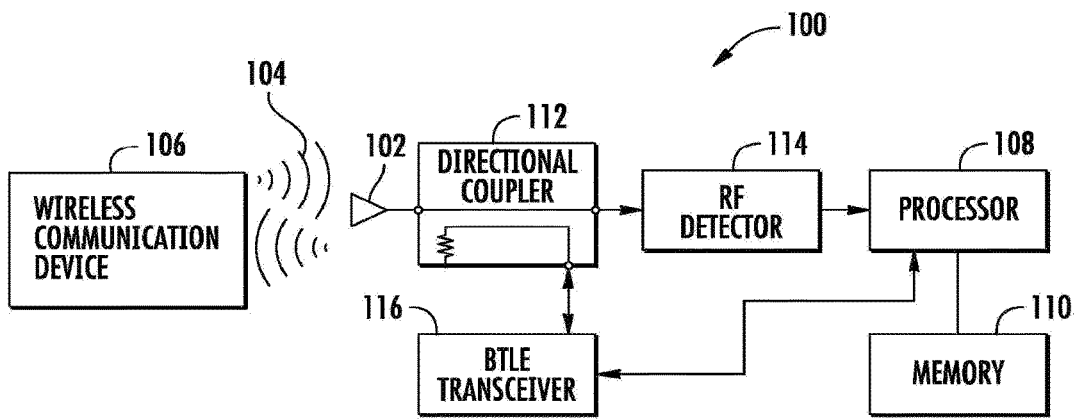
FIG. 1 is a schematic view of an exemplary embodiment of a system for validating a wakeup signal constructed in accordance with the present disclosure, showing a transceiver and a processor.

Reference will now be made to the drawings wherein like reference numerals identify similar structural features or aspects of the subject disclosure. For purposes of explanation and illustration, and not limitation, a partial view of an exemplary embodiment of a system for validating a wake up signal in accordance with the disclosure is shown in FIG. 1 and is designated generally by reference character 100. Other embodiments of systems and methods in accordance with the disclosure, or aspects thereof, are provided in FIGS. 2-4, as will be described.

FIG. 1 illustrates a system 100 in accordance with the present disclosure for validating a wake up signal. As will be described in further detail, the system 100 achieves low sleep current during nonuse thereby preventing unnecessary power consumption within the system. The system 100 includes an antenna 102 for receiving a wakeup signal 104 from a wireless communication device 106. The system 100 takes advantage of automatic transmissions that are emitted from the wireless communication device 106 when the device 106 initiates contact with the system 100. The wireless communication device 106 can be a smartphone or any other type of Bluetooth wireless device which transmits an RF signal. To reduce unnecessary power consumption, the RF signal received by the antenna 102 is passively received through a non-powered, low loss directional coupler 112 to a non-powered and efficient RF detector 114. The RF detector 114 receives the RF wake signal and converts the RF wakeup signal to DC pulses which is received by a processor 108 connected thereto. To further conserve power, the processor 108 is in a deep sleep until the DC pulses are received. When the processor 108 receives the DC pulses, the processor reads from a specific location in a memory 110 operatively connected to the processor. The memory contains further instructions and wakeup validation criteria that enable the processor 108 to transition from a deep sleep mode to an active mode if all validation steps are passed. More specifically, the processor 108 evaluates the wake up signal 104 and if the signal is valid, the processor 108 remains awake. Once the processor is fully awakened by a valid wakeup signal, the processor powers up the remaining components 112, 114, 116 of the system 100. A BTLE transceiver 116 operatively connected to the directional coupler 112 establishes a link with the device 106. Through the directional coupler 112 and antenna 102, the BTLE transceiver 116 communicates to the wireless communication device 106 that the wakeup signal 104 has been validated and prompts a user of the device to enter an access code, for example, to lock/unlock a door.

Figure 2:
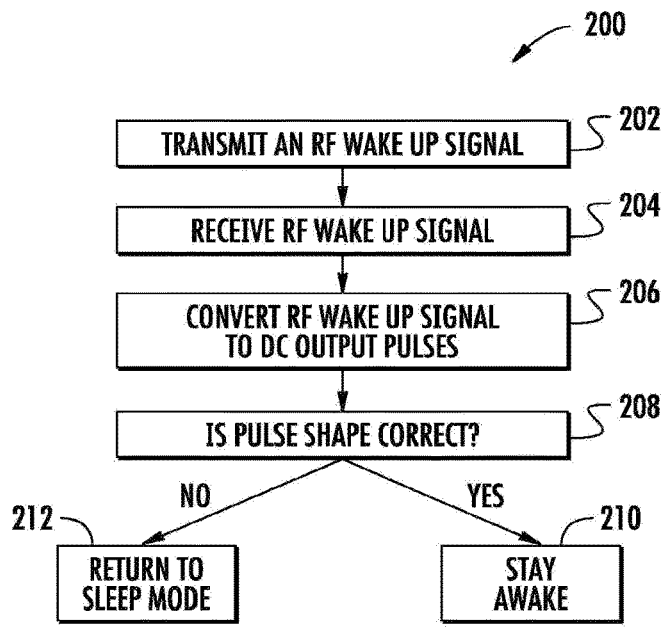
FIG. 2 is a flow chart showing an exemplary embodiment of a method for validating a wakeup signal using the system of FIG. 1.

With reference to FIG. 2, a method 200 of validating a wake up signal is shown. A wireless communication device, e.g., wireless communication device 106, transmits an RF wakeup signal at box 202. The RF wakeup signal can be generated through any suitable technique. For example, an application stored on the wireless communication device, once activated, can cause the wireless communication device to transmit the RF signal. Next, the wake up signal is received at an antenna, e.g., antenna 102, at box 204. The wakeup signal is directed to an RF detector, e.g., RF detector 114, through a directional coupler, e.g., directional coupler 112. The RF detector converts the RF signal to DC pulses, as shown at box 206, so that the signal is read as DC pulses by a processor, e.g., processor 108. The processor partially awakes from a sleep mode once the processor detects the received DC pulses. The processor validates the DC pulses by analyzing the time between pulses, at box 208. If the pulse shape, e.g., the timing, is correct, the processor exits sleep mode and remains awake, as shown at box 210, however, if the processor determines the pulse shape is incorrect, the processor does not exit sleep mode, but instead returns to a deep sleep mode, as shown at box 212. In the deep sleep mode, the processor can remain completely inactive until partially awakened by the next DC signal from the RF detector.

Figure 3:
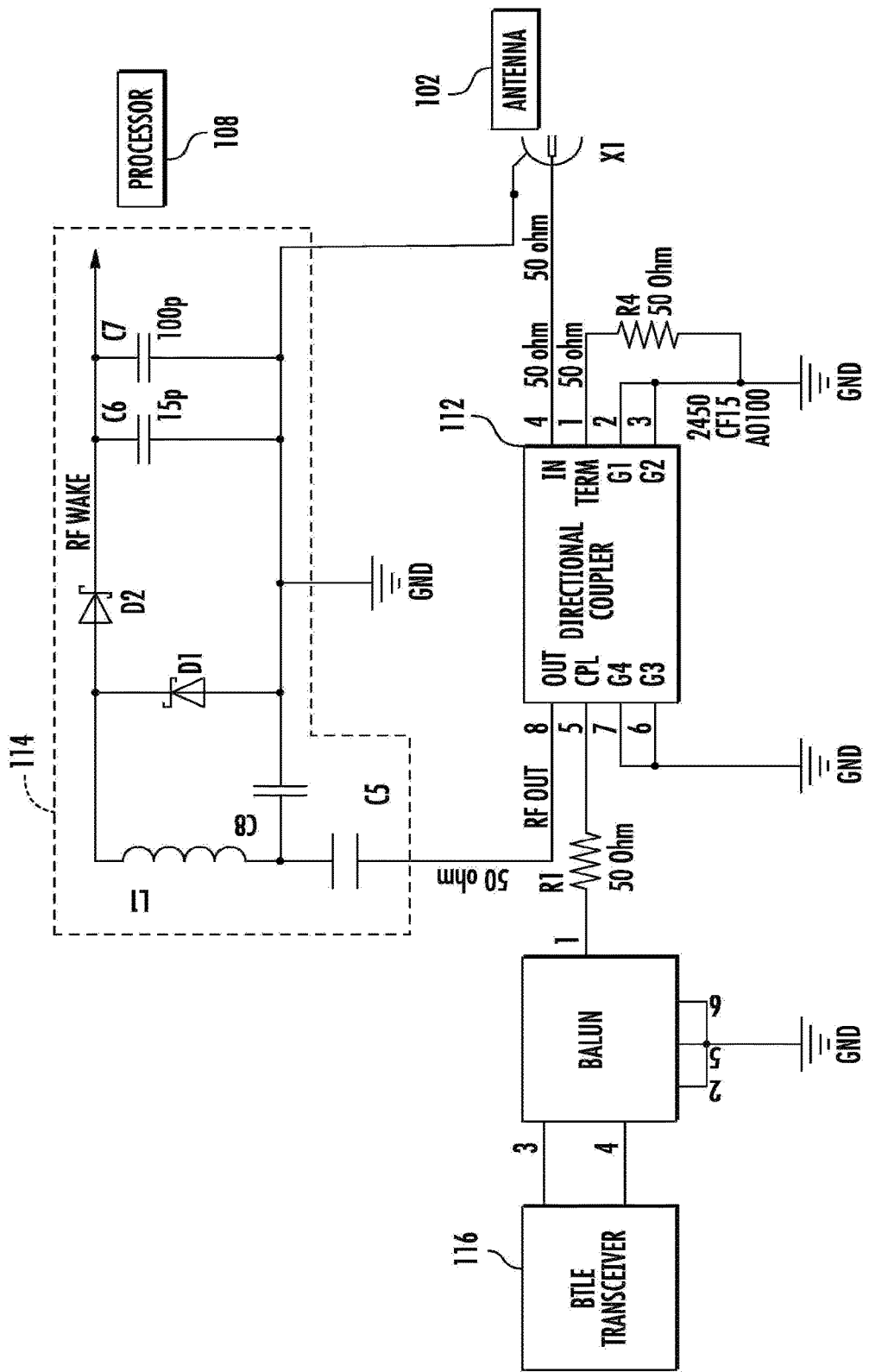
FIG. 3 is a schematic view of an exemplary RF passive wakeup circuit of the processor of FIG. 1.

In this manner, the processor 108 follows a two-step approach to determine if the RF wake up signal 104 is valid. First, the directional coupler and RF detector uses passive analog verification of the RF wakeup signal. During this time the processor is polling an interrupt pin looking for certain DC voltage. If the analog section filter passes, the DC voltage rises enough to trip the processor to wake from deep sleep. The processor requires very little power to partially awaken from a sleep mode and even less while monitoring its interrupt port. Second, the DC pulses of the passive signal are analyzed using digital processing in the processor to determine if the wake up signal 104 is valid. With reference to FIG. 3, a schematic view of an exemplary embodiment of a circuit 300 for system 100 is shown illustrating the detailed connection between the BTLE transceiver 116, the directional coupler 112 and the RF detector 108. The RF detector is operatively connected to the processor 108 to send the DC pulses thereto. The antenna is 102 is operatively connected to the directional coupler 112 to send and receive signals.

Figure 4:
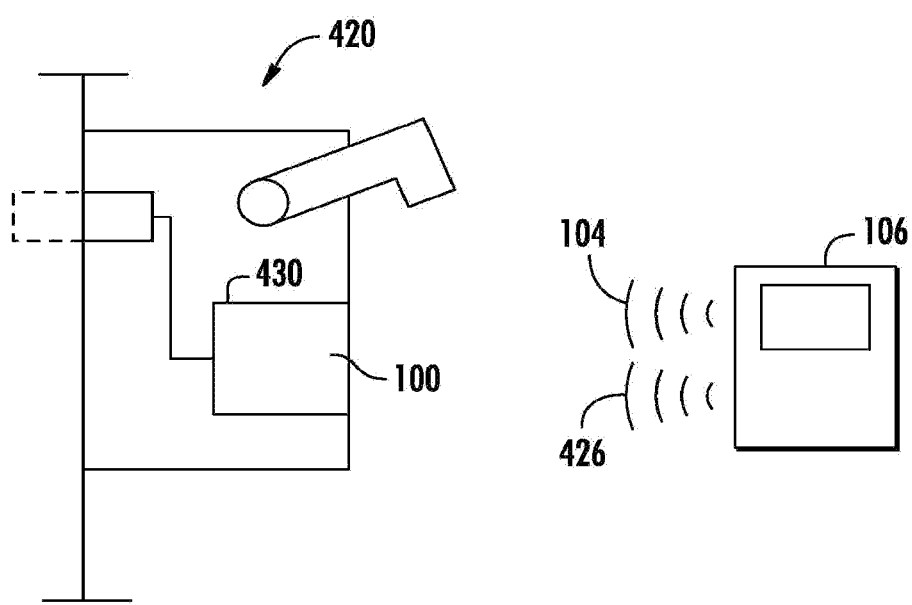
FIG. 4 is a schematic view the system of FIG. 1 used with an exemplary embodiment of a locking mechanism.

The system 100 can be operatively connected to a locking mechanism 420 as shown in FIG. 4. Once the processor 108 is awakened by the wake up signal 104, as described above, the system verifies additional criteria, if needed, to activate the locking mechanism 420 and provide access, e.g., for a guest to enter a hotel room using a wireless device. System 100 maintains low power consumption during nonuse to conserve power so that locking mechanism 420 can operate on battery power. The locking mechanism is a lock 420 on a door, for example, a door to a hotel room or a door of a house, etc. The lock 420 can switch between a locked state and an unlocked state to allow a user entry/exit. A wireless interface 430 is operatively connected to the lock 420 to control change between the locked and unlocked states. The wireless interface 430 includes system 100. A user attempting to lock or unlock the door transmits the RF wake up signal 104 from the wireless communication device 106. Processor 108 of system 100 validates the wake up signal 104. If the wake up signal 104 is valid, the BTLE transceiver 116 prompts the user to enter an access code 426 into the wireless communication device 106. The access code 426 is received by the antenna 102 of system 100 and is passed through the directional coupler 112 and received by the BTLE transceiver 116 now in a receive mode. The BTLE transceiver demodulates the access code 426 and the access code 426 is presented to the processor 108 for memory 110 verification. The processor 108 using the memory 110 compares this code with a stored code. If the access code 426 is valid, i.e., if a match between the access code and stored code is found, processor 108 proceeds to send a lock/unlock signal to the locking mechanism 420 through motor driver circuitry (not shown).

In this manner, a wireless communication device can be used to transmit a wireless wake up signal to lock or unlock the door. Further, as the processor only remains awake upon validation of the wake up signal, the power consumption in the wireless interface is minimized thereby extending the life of the locking mechanism. It will be understood that the locking mechanism shown herein is exemplary and that any other suitable number and/or type of locking mechanism can be used without departing from the scope of this disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods and systems of the present disclosure, as described above and shown in the drawings, provide for processor validated systems and methods with superior properties including minimizing power consumption of a system during nonuse. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system comprising:
   a transceiver that is passive and unpowered and that is configured for receiving an RF wake up signal from a wireless communication device and converting a received wakeup signal to DC pulses; and
   a processor operatively connected to the transceiver and to a memory, wherein the memory includes instructions recorded thereon that, when executed by the processor, cause the processor to:
   power up the transceiver once in an active mode
   detect an interrupt by the DC pulses while in a deep sleep mode;
   partially awaken to analyze the detected DC pulses to determine if the wake up signal is valid;
   transition to an active mode upon validation of the wake up signal to activate and power up remaining components of the system if the wake up signal is valid; and
   a second transceiver of the remaining components configured to, upon being activated and powered up:
   prompt a user for an access code; and
   receive an access code in response to the prompt;
   wherein the processor upon execution of the instructions is further caused to:
   compare the access code received in response to the prompt via at least one of the transceiver and the second transceiver to a stored value; and
   the comparison, a locking mechanism to switch between locked and unlocked states.

2. The system of claim 1, wherein the processor analyzes a pulse of the wake up signal to determine if the wake up signal is valid.

3. The system of claim 1, wherein the processor allows communication between the transceiver and a mobile communication device.

4. The system of claim 1, wherein the RF wake up signal is from an RF source.

5. The system of claim 4, wherein the RF source is a smart phone.

6. The system of claim 4, further comprising an RF detector for converting the RF wake up signal to DC pulses to be evaluated with a DC processor.

7. A method for transitioning a system from a sleep mode to an active mode, comprising:
   receiving an RF wake up signal from a wireless communication device at a transceiver;
   converting the received RF wakeup signal to DC pulses;

detecting an interrupt by the DC pulses while in a deep sleep mode;
partially awakening to analyze the detected DC pulses to determine if the wake up signal is valid;
transitioning to an active mode upon validation of the wake up signal to activate and power up remaining components of the system if the wake up signal is valid;
return to the deep sleep mode if the wake up signal is invalid;
upon being activated and powered up, prompting by one of the remaining components a user for an access code by a component of the remaining components;
comparing an access code received in response to the prompt to a stored value; and
activating, based on a result of the comparison, a locking mechanism to switch between locked and unlocked states
waking the processor from a sleep mode upon a valid wake up signal.

8. The method of claim 7, wherein validating comprises analyzing a pulse of the wake up signal to determine if the wake up signal is valid.

9. The method of claim 7, wherein receiving comprises receiving an RF wake up signal from an RF source.

10. The method of claim 9, wherein receiving a wakeup signal includes receiving an RF wake up signal and converting the RF wake up signal to a DC pulse to be evaluated with a DC processor.

11. The method of claim 7, further comprising powering up the transceiver to communicate with a mobile communication device.

\* \* \* \* \*